US012351128B2

(12) United States Patent
Grisey et al.

(10) Patent No.: US 12,351,128 B2
(45) Date of Patent: Jul. 8, 2025

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventors: Christophe Grisey, Colomiers (FR); Xavier Bressan, Escalquens (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/728,243

(22) PCT Filed: Dec. 20, 2022

(86) PCT No.: PCT/EP2022/086907
§ 371 (c)(1),
(2) Date: Jul. 11, 2024

(87) PCT Pub. No.: WO2023/147929
PCT Pub. Date: Aug. 10, 2023

(65) Prior Publication Data
US 2025/0074357 A1    Mar. 6, 2025

(30) Foreign Application Priority Data

Feb. 4, 2022  (FR) ..................... 2200994

(51) Int. Cl.
*B60R 25/24* (2013.01)
*B60R 25/30* (2013.01)
*B60W 50/00* (2006.01)

(52) U.S. Cl.
CPC ............ *B60R 25/24* (2013.01); *B60R 25/305* (2013.01); *B60W 50/00* (2013.01);
(Continued)

(58) Field of Classification Search
CPC ...... B60R 25/24; B60R 25/305; B60W 50/00; B60W 2556/45; B60W 2420/408; B60W 2420/403; B60W 2520/04
See application file for complete search history.

(56) References Cited

U.S. PATENT DOCUMENTS 10,988,114 B2 *  4/2021  Grisey ............... G07C 9/00309
11,184,093 B2 * 11/2021  Boudet .................. H04B 17/12
(Continued)

FOREIGN PATENT DOCUMENTS

WO      02072987 A1    9/2002

OTHER PUBLICATIONS

English translation of the Written Opinion of the International Searching Authority (Form PCT/ISA/237) issued Apr. 4, 2023, by the European Patent Office in corresponding International Application No. PCT/EP2022/086907. (5 pages).
(Continued)

*Primary Examiner* — Peter D Nolan
*Assistant Examiner* — Wae L Louie
(74) *Attorney, Agent, or Firm* — Buchanan Ingersoll & Rooney PC (57) ABSTRACT

A method for activating a function of a motor vehicle by an activation device including a plurality of transceivers capable of transmitting to the world outside the vehicle, from portable access equipment carried by a user. Activation of the function being triggered by detection of the presence of the user in a predetermined area around the vehicle during a polling phase, and depending on a result of authentication of the portable access device by the vehicle during an identification phase, the vehicle being equipped with a driver assistance system including a device for detecting and identifying obstacles in an environment nearby the vehicle. The method including: detection by the driver assistance
(Continued)

system of at least one stationary obstacle in the predetermined area, and identification of the obstacle; and polling and identifying, modification of the transmission parameters of the transceivers transmitting in the direction of the obstacle thus detected and identified.

22 Claims, 7 Drawing Sheets

(52) U.S. Cl.
CPC . *B60W 2420/403* (2013.01); *B60W 2420/408* (2024.01); *B60W 2520/04* (2013.01); *B60W 2556/45* (2020.02)

(56) References Cited

U.S. PATENT DOCUMENTS

| | | | |
|---|---|---|---|
| 11,440,502 B2* | 9/2022 | Fournié | G07C 9/00309 |
| 11,513,814 B1* | 11/2022 | Luban | G06F 1/3215 |
| 2004/0075341 A1* | 4/2004 | Belinguier | H04B 7/12 |
| | | | 307/10.1 |
| 2016/0214573 A1* | 7/2016 | Lagabe | B60R 25/245 |
| 2019/0299847 A1* | 10/2019 | Mori | B60Q 1/247 |
| 2020/0074491 A1* | 3/2020 | Scholl | G06V 20/597 |
| 2020/0282952 A1* | 9/2020 | Fournié | G07C 9/00309 |
| 2020/0377056 A1* | 12/2020 | Grisey | G06F 3/0346 |
| 2021/0167876 A1* | 6/2021 | Boudet | H04W 88/02 |
| 2021/0221330 A1* | 7/2021 | Boudet | B60R 16/037 |
| 2021/0262811 A1* | 8/2021 | Zellner | G01C 21/3492 |
| 2022/0048507 A1* | 2/2022 | Grewal | B60W 30/17 |
| 2022/0063652 A1* | 3/2022 | Taylor | B60W 30/14 |
| 2022/0105930 A1* | 4/2022 | Kurakami | B60W 50/0097 |
| 2022/0153262 A1* | 5/2022 | Gallo | G01S 7/417 |
| 2022/0234607 A1* | 7/2022 | Hata | B60W 60/001 |
| 2023/0382223 A1* | 11/2023 | Roberts | B60K 35/00 |

OTHER PUBLICATIONS

International Search Report (PCT/ISA/210) with translation and Written Opinion (PCT/ISA/237) mailed on Apr. 4, 2023 by the European Patent Office as the International Searching Authority for International Application No. PCT/EP2022/086907. (11 pages).

* cited by examiner

METHOD FOR ACTIVATING A VEHICLE FUNCTION AND ASSOCIATED ACTIVATION DEVICE

CROSS REFERENCE TO RELATED APPLICATIONS

This application is the U.S. National Phase Application of PCT International Application No. PCT/EP2022/086907, filed Dec. 20, 2022, which claims priority to French Patent Application No. 2200994, filed Feb. 4, 2022, the contents of such applications being incorporated by reference herein.

FIELD OF THE INVENTION

The invention relates to a method for activating a function of a motor vehicle and an associated activation device. The invention applies particularly but entirely non-limitingly to the function of hands-free access to a motor vehicle, that is to say to the function of locking and unlocking the opening elements of a motor vehicle.

BACKGROUND OF THE INVENTION

In a motor vehicle, it is known to use presence detection devices for detecting the presence of a hand or of a foot of a user of the vehicle and thus to allow all or some of the opening elements of the vehicle, for example the doors or the trunk, to be locked or unlocked. By way of example, the detection of the presence of a hand of a user on or in front of a door handle in conjunction with the recognition of an identifier of "hands-free" access equipment carried by this user makes it possible to lock and unlock these opening elements.

What is referred to as a "hands-free" access system for accessing a motor vehicle allows an authorized user to lock and/or unlock the opening elements of their vehicle without having to physically press buttons on a key. For this purpose, the vehicle identifies portable equipment such as a fob or remote control or even a key carried by the user and, if the fob or the remote control or indeed the key is situated in a predetermined area around the vehicle or in the vehicle and is identified as belonging to the vehicle, then the vehicle automatically locks/unlocks its opening elements according to the intention of the user, without the user having to physically manipulate a key.

To achieve this, when the user approaches the vehicle, communication is established over a wireless communication link between the portable access equipment, for example an electronic fob or a smart cell phone, and the detection device in order to authenticate said access equipment by virtue of its identifier.

To this end, the detection device comprises an antenna allowing the identifier sent by the portable access equipment to be received. The detection device is connected to an electronic control unit (ECU) of the vehicle, to which it transmits the identifier.

According to the prior art, the access equipment is generally an electronic fob. The signal received by the antenna of the detection device, comprising the identifier of the access equipment, is transmitted via RF (radiofrequency) or LF (low-frequency) waves. The precise location of the portable equipment around the vehicle is found by measuring the strength of the LF signal received by the portable equipment (via the antennas and the electronic control unit) from the vehicle, the strength measurements more commonly being called RSSI measurements (RSSI standing for Received Signal Strength Indication). The measurement of the power of the signal received by the portable equipment from each LF antenna is received and analyzed by a detection device embedded in the vehicle, which thus determines the position of the portable equipment with respect to said LF antennas, i.e. with respect to the vehicle.

According to the location of the portable equipment identified by the vehicle, in said location areas, certain actions which are specific to said location areas are performed automatically: unlocking/locking or preliminarily turning on the lighting in the passenger compartment (also called welcome lighting).

Nowadays, however, it is increasingly common to use a cell phone to perform authentication functions, this making it possible to avoid using a dedicated electronic fob and thus to limit the number of items of equipment. The majority of cell phones do not possess RF or LF communication means. It therefore becomes necessary to adapt the "hands-free" start-up and/or access system for a vehicle in order for it to be able also to function with a cell phone equipped with other communication standards, such as, for example, ultra-wideband, or BLE (Bluetooth Low Energy®), or Wi-Fi (Wireless Fidelity) communication and no longer only using radio-frequency and low-frequency (RF, LF) waves. Ultra-wideband (UWB), in particular, is a radio modulation technique which is based on transmitting pulses of a very short duration, often less than a nanosecond. Thus, the passband may reach very large values.

Approach of the access equipment into proximity with (less than 10 cm away from) the detection device and the identifier received by the computer being recognized, in conjunction with the presence of the hand of the user being detected, allows the door to be locked or unlocked.

In order to detect this approach and to authenticate the access equipment, the vehicle repeatedly transmits UWB or BLE signals in a predetermined wide area around the vehicle. This repeated transmission is called "polling".

The drawback of this repeated transmission mainly resides in the consumption of electricity from the battery of the vehicle that is required to generate it. The risk is of course that the vehicle will no longer be able to start when it has stayed several weeks in a parking lot while continuing to carry out polling in search of access equipment in the predetermined area around the vehicle.

There are many prior-art methods aimed at modifying the polling strategy as a function of time, by reducing the frequency of transmission for example, but their drawback then lies in the inconvenience caused to the user when they return to their vehicle, because the latter then takes longer to detect them.

The activation method according to an aspect of the invention provides an alternative to the strategies of the prior art aimed at limiting the electricity consumption of the vehicle caused by polling.

SUMMARY OF THE INVENTION

An aspect of the invention relates to a method for activating a function of a motor vehicle by means of an activation device comprising a plurality of transceivers capable of transmitting to the world outside the vehicle, from portable access equipment carried by a user, activation of the function being triggered by detection of the presence of the user in a predetermined area around the vehicle during a polling phase, and depending on a result of authentication of the portable access device by the vehicle during an identification phase, the vehicle further being equipped with a driver assistance system comprising means for detecting and identifying obstacles in an environment nearby the vehicle, the method being noteworthy in that it comprises the following steps:
  a. detection by the driver assistance system of at least one stationary obstacle in the predetermined area, and identification of said obstacle,
  b. in the polling and identification phase, modification of transmission parameters of the transceivers transmitting in the direction of the obstacle thus detected and identified.

In one particular embodiment of the method according to the invention, the modification of the transmission parameters consists in deactivation of the transceivers and in that the polling and identification phases are carried out using the non-deactivated transceivers.

The modification of the transmission parameters may consist in a reduction in range.

The modification of the transmission parameters may consist in a reduction in polling frequency.

Alternatively, the modification of the transmission parameters consists in a reduction in range and a reduction in polling frequency.

Advantageously, the method further comprises a step of increasing the range of the transceivers adjacent to the transceivers the transmission parameters of which have been modified.

Judiciously, the method comprises a preliminary phase of determining the transceivers transmitting in the direction of the obstacle and the transmission parameters of which are to be modified depending on a position of the obstacle and/or depending on a position of an obstacle detection and identification means.

The detection and identification may be carried out when the vehicle is at rest with an engine/motor of said vehicle turned on.

The detection and identification may also be carried out at a predetermined frequency when the vehicle is at rest, with the engine/motor turned off.

Preferably, the obstacle determination and identification phase and the polling phase are synchronized.

An aspect of the invention also relates to a motor vehicle comprising a device for activating a vehicle function comprising a plurality of transceivers capable of transmitting to the world outside the vehicle, activation of the function being triggered by detection of the presence of the user in a predetermined area around the vehicle during a polling phase, and depending on a result of authentication of a portable access device by the vehicle during an identification phase, the vehicle further being equipped with a driver assistance system comprising means for detecting and identifying obstacles in an environment nearby the vehicle, the vehicle being noteworthy in that:
  a. the driver assistance system is capable of:
    i. detecting stationary obstacles in the predetermined area,
    ii. identifying said obstacles,
  b. and in that the vehicle further comprises:
    i. means for modifying the transmission parameters, during the polling and identification phases, of the transceivers transmitting in the direction of the obstacle depending on the detection and identification of said obstacle by the driver assistance system.

The parameter modification means may consist of transceiver deactivation means.

The parameter modification means may consist of range reduction means.

The parameter modification means may consist of polling-frequency reduction means.

Alternatively, the parameter modification means may consist of range reduction means and polling-frequency reduction means.

Advantageously, the vehicle may also comprise means for increasing the range of the transceivers adjacent to the transceivers of modified transmission parameters.

The driver assistance system may comprise at least one camera, and/or at least one radar, and/or at least one lidar.

Judiciously, the vehicle further comprises means for determining the transceivers the transmission parameters of which are to be modified depending on a position of the obstacle, and/or depending on a position of the obstacle detection and identification means.

An aspect of the invention also relates to any computer program product comprising program code instructions for executing the steps of the method according to any one of the features listed above, when said program is executed on a computer.

BRIEF DESCRIPTION OF THE DRAWINGS

Further features and advantages of aspects of the invention will become more clearly apparent on reading the following description. This description is purely illustrative and is to be read with reference to the appended drawings, in which.

DETAILED DESCRIPTION OF EXEMPLARY EMBODIMENTS

Figure 1:
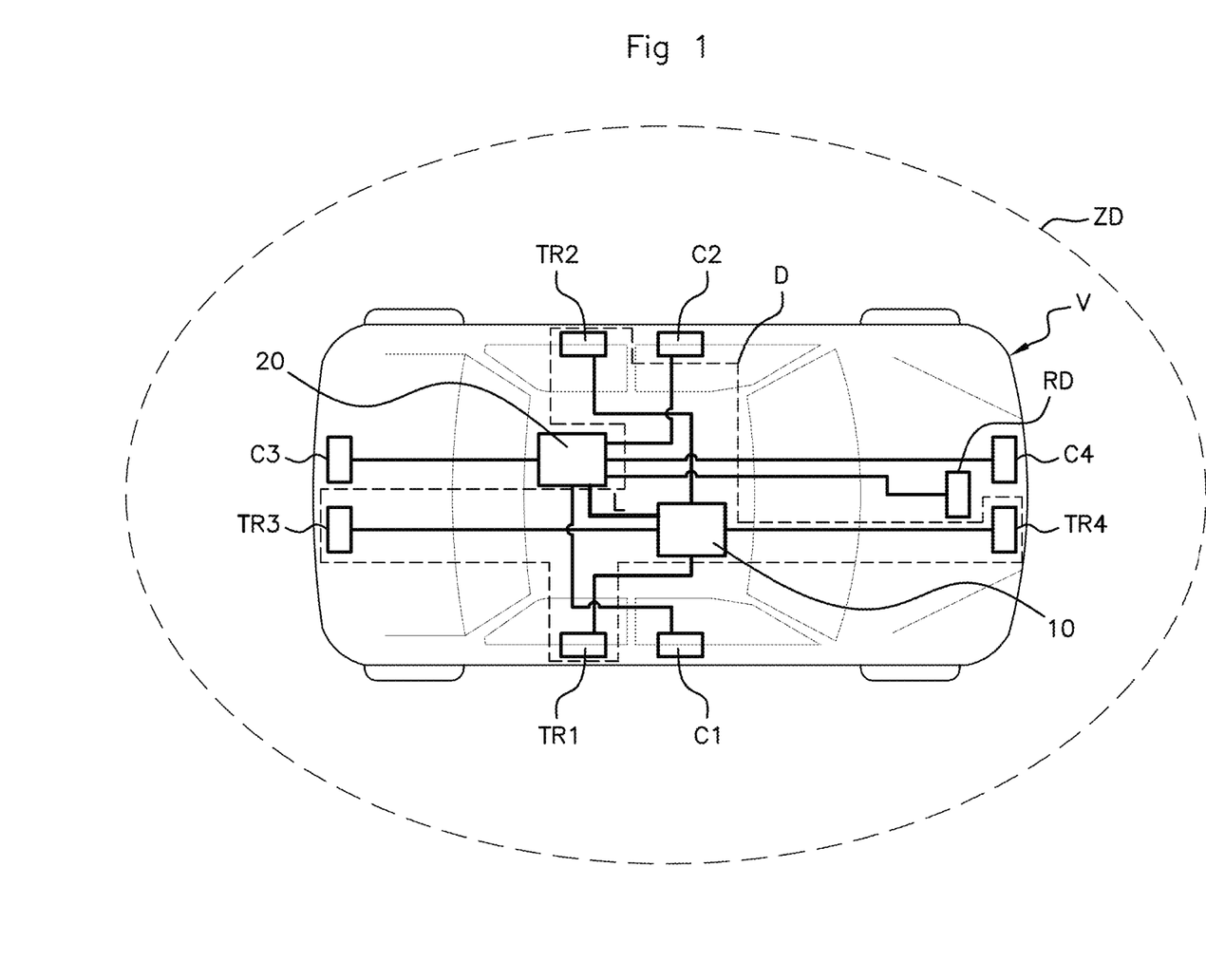
FIG. 1 schematically shows a vehicle according to an aspect of the invention comprising a driver assistance system connected to a device for activating a vehicle function, FIG. 2A schematically shows a first particular embodiment of the activation method according to the invention, FIG. 2B schematically shows a second particular embodiment of the activation method according to the invention, FIG. 2C schematically shows a third particular embodiment of the activation method according to the invention, FIG. 2D schematically shows a fourth particular embodiment of the activation method according to the invention, FIG. 3 schematically shows the device for activating a vehicle function connected to the driver assistance system, according to an aspect of the invention.

FIG. 1 shows a vehicle V comprising a device D for activating a vehicle function and a driver assistance system ADS.

The activation device D comprises, in a manner known per se, a plurality of transceivers TR1, TR2, TR3, TR4 each equipped with at least one communication antenna capable of transmitting low-frequency or high-frequency or ultra-high frequency radio waves, for example BLE, Wi-Fi or UWB waves, that are directed toward the world outside the vehicle V.

By low-frequency, what is meant is waves about the order of magnitude of one hundred kHz, and by high-frequency or ultra-high frequency, what is meant is waves of the order of magnitude of MHz or GHz, for example BLE waves at 2.4 GHz, UWB waves from 6 GHz to 10 GHz, Wi-Fi waves at 2.45 GHz, or 5 GHz, etc.

The transceivers TR1, TR2, TR3, TR4 are electrically connected to an electronic control unit 10 which manages the transmission and reception of data by said transmitters.

The activation device D makes it possible to detect the presence of portable access equipment SD in a predetermined area ZD around the vehicle during a phase called the "polling" phase, and to authenticate it during a phase called the "identification" phase, in order to activate a vehicle function such as, for example, locking or unlocking the opening elements of the vehicle V, but also switching on the headlights of the vehicle, heating the driver's seat, or applying driver-specific presets (adjustment of the driver's seat for example).

How an activation device D and the method of hands-free access by means of said device work is known to those skilled in the art and will not be described in more detail here.

The driver assistance system ADS for its part comprises at least one camera, and/or at least one lidar, and/or at least one radar capable, alone or in combination, of detecting the environment nearby the vehicle and identifying the various obstacles that could be found therein. In the present case, the driver assistance system ADS makes it possible to detect, when the vehicle V is being driven, any obstacle such as a wall, a security barrier, another vehicle, a pedestrian, a cyclist, an animal, etc. located in the environment nearby the vehicle V or on its path, in order to warn the driver so that they may take the necessary measures to avoid the obstacle or even to act in their place, in the case of an autonomous or semi-autonomous vehicle V.

The driver assistance system ADS may operate based on a combination of data acquired by a plurality of sensors, such as cameras, lidars or radars, that, once the data have been combined and processed, allows the environment nearby or within a few meters of the vehicle V to be accurately determined and identified. This is referred to as sensor fusion, or in other words pooling and processing of the data delivered by the sensors of the driver assistance system ADS.

FIG. 1 shows in an illustrative and non-limiting manner four cameras C1, C2, C3, C4 embedded in the vehicle and each located on one of the four sides of the vehicle V, thus making it possible to view the nearby environment around each side of the vehicle. The vehicle V also comprises a reversing radar RD. The cameras C1, C2, C3, C4 and the radar RD are connected to a central management unit 20, which receives data from the cameras and radar and comprises means, software for example, allowing an obstacle to be recognized, the distance to the obstacle to be computed and it to be identified.

Of course, an aspect of the invention also applies to any vehicle V comprising, for example, only one or two cameras.

According to an aspect of the invention, the driver assistance system ADS is also capable of:
a. when the vehicle is at rest and the engine/motor turned on, and
b. when the vehicle is at rest and the engine/motor turned off, detecting stationary obstacles in the predetermined area ZD and identifying them in order to differentiate between them, for example between a wall and another parked vehicle. To this end, it comprises means M0 for detecting and identifying obstacles when the vehicle is at rest (cf. FIG. 3); as already noted, these means may consist of at least one camera, and/or at least one radar and/or at least one lidar and of software means for processing the data delivered by one or more of these sensors.

Of course, when the engine/motor is turned off, the driver assistance system ADS is then active only periodically in order to limit discharge of the battery of the vehicle V. To this end, the driver assistance system ADS enters wake-up phases and standby phases.

As will be detailed below, the wake-up phases of the driver assistance system ADS are synchronized with the polling phases of the activation device D.

Still according to an aspect of the invention, the vehicle Vis, for its part, during the polling and identification phases, capable of modifying the transmission parameters of the transceivers TR1, TR2, TR3, TR4 transmitting in the direction of the stationary obstacle that has thus been detected in the predetermined area and identified by the driver assistance system ADS.

Transmission parameters are understood to mean, for example, the transmission range, the polling frequency, and the thresholds for detection of the location of the portable access equipment SD in a predetermined area around the vehicle V.

To this end, the vehicle V further comprises means M1 for modifying the transmission parameters of said transceivers. Said modification means M1 may for example be included in the electronic control unit 10 of the activation device D (cf. FIG. 3), and for example consist of software means. The modification means for example consist of range reduction means that are capable of reducing the dimensions of the transmission area of the transmitters in the phase of polling around the vehicle V or of means for reducing the polling frequency during the polling phases. Thus, the range and/or the frequency at which the transceivers are activated may be reduced.

In one particular embodiment of the invention, the vehicle V is capable of deactivating the transceivers that are directed or the transmissions of which are directed toward the stationary obstacle thus identified. The transmission parameter modification means then consist of transceiver deactivation means.

In a second embodiment of the invention, the vehicle V is capable of increasing the range of the transceivers adjacent to the transceivers the range of which has been reduced or which have been deactivated. It then comprises means M2 for increasing the range of the adjacent transceivers. Likewise, said range-increasing means M2 may be included in the activation device D, for example in the electronic control unit 10 (cf. FIG. 3). What is meant by "adjacent" is the transceivers located beside or in proximity to the transceivers the range of which has been reduced even if said transceivers are located on another side of the vehicle V.

What is meant by means M2 for reducing or increasing transmission range is any means for reducing or enlarging the transmission area of the transceivers, in the present case means for adjusting the transmission power of the transceivers.

What is meant by means for reducing the polling frequency is any component, or software, associated with a clock making it possible to activate and deactivate the transceivers at a predetermined frequency.

The vehicle V further comprises means M3 allowing it to identify the transceivers the transmission parameters of which must be modified or which must be deactivated depending on the position of the stationary obstacle thus detected and identified.

For this purpose, the vehicle V may comprise a correlation table which has been predesigned or predetermined during a prior calibration phase and stored, making it possible to determine the transceiver of the vehicle on which it is necessary to act depending on the position of the obstacle thus detected.

The driver assistance system ADS is for its part capable of determining not only a position of the obstacle M, V1 . . . V5 with respect to the vehicle V but also a distance between the vehicle V and the obstacle. This position and this distance are of course correlated with the transceivers TR1 . . . TR4, which have a fixed position on the vehicle V, and make it possible to determine the transceiver TR1 . . . TR4 on which it is necessary to act.

Figure 3:
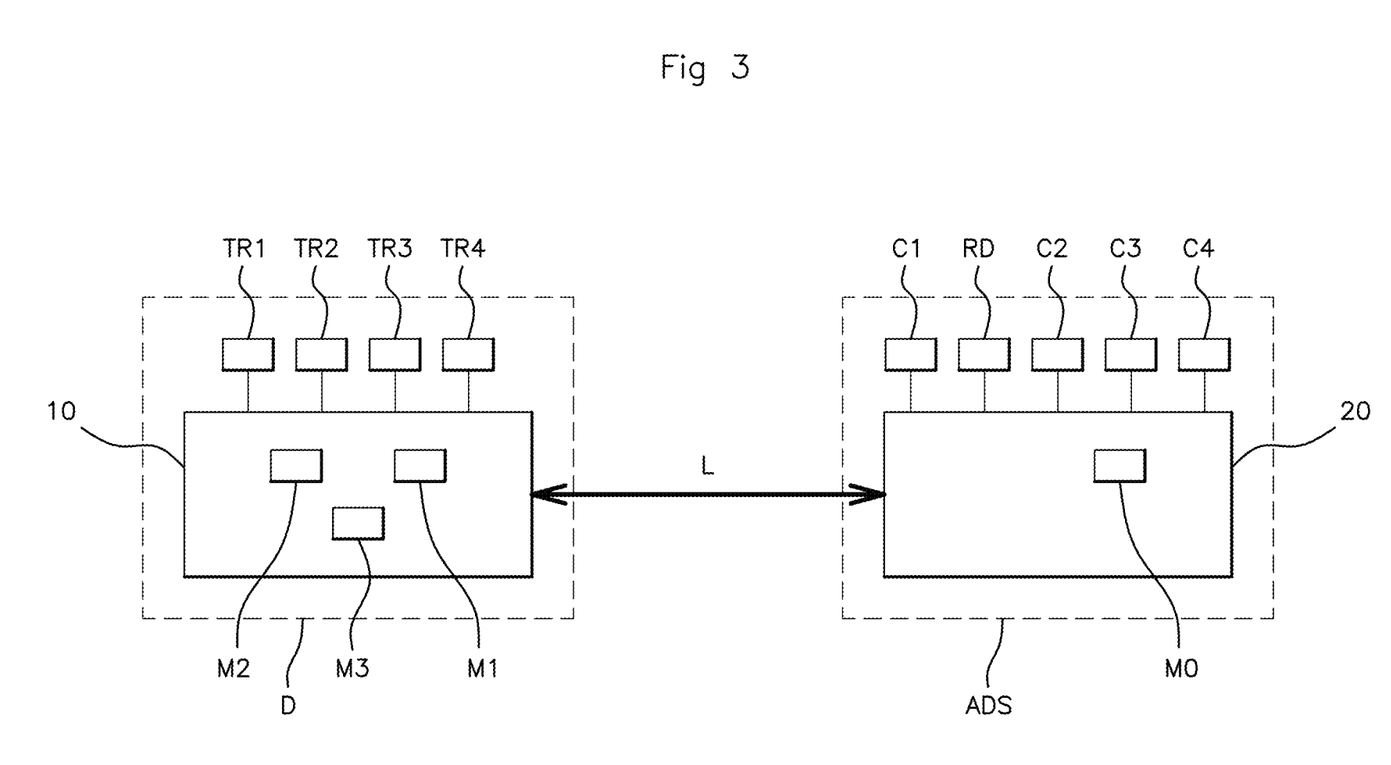

In one particular embodiment illustrated in FIG. 3, the activation device D is electronically connected (cf. link "L" in FIG. 3) to the driver assistance system ADS. The two devices interact in order to manage (reduce/increase the range or deactivate) the transceivers TR1, TR2, TR3, TR4 of the activation device D depending on the obstacles detected by the driver assistance system ADS in the predetermined area ZD.

Figure 4:
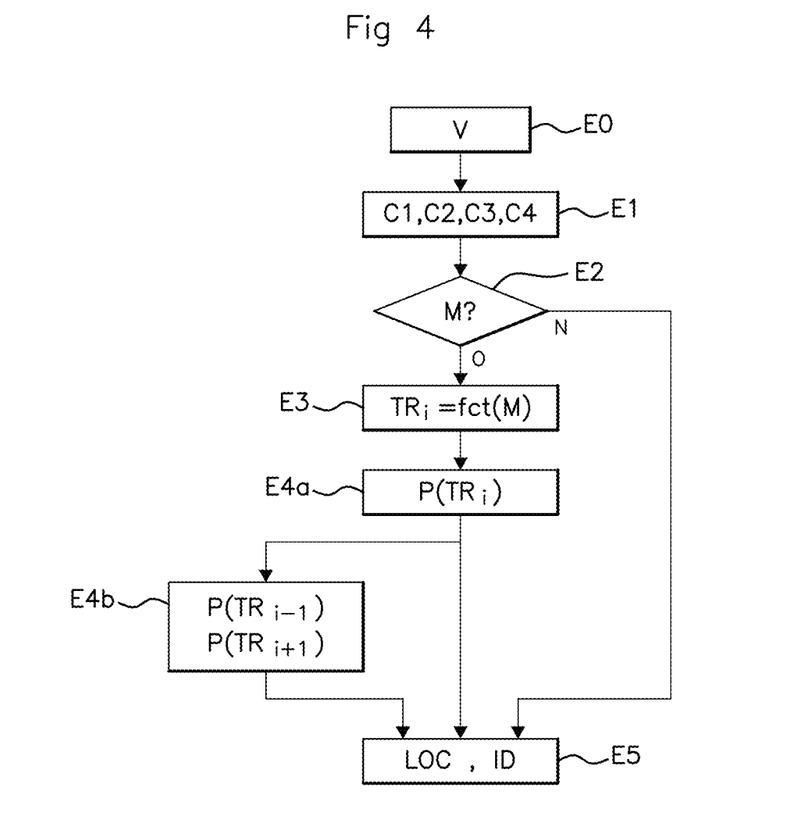
FIG. 4 is a flowchart illustrating the various steps of the activation method according to an aspect of the invention.

The activation method, illustrated in FIG. 4, will now be described.

In an initial step E0, it is detected that the vehicle is immobile, parked for example. The driver may still be in the vehicle, the vehicle unlocked and the engine/motor turned on, or the driver is no longer in the vehicle, the vehicle is locked and the engine/motor is turned off.

In a first step E1, the driver assistance system ADS is activated, and the one or more cameras C1, C2, C3, C4 view the environment nearby the vehicle V, more particularly in the predetermined area ZD. There may of course be a plurality of predetermined areas around the vehicle, each camera viewing a space in one of the predetermined areas.

In the following step E2, if an obstacle M, V1, V2, V3, V4, V5 is detected in a field of view of at least one of the cameras and identified by the driver assistance system ADS as being a stationary obstacle, then the method modifies the one or more transmission parameters of the transceiver TR1, TRi . . . TR4 that is oriented toward the obstacle, i.e. TRi=fct (M), or the transmission area of which covers said obstacle (step E4a), for example by reducing its transmission power P(TRi) and/or by modifying the polling frequency. It is also possible to only reduce the polling frequency without reducing the transmission power.

For this purpose, the vehicle V comprises a correlation table collating the correlation between the position of the transceiver TR1, TR2, TR3, TR4 and the position of the detected obstacle and its distance from the vehicle, i.e. TRi=fct(M), and/or the position of an obstacle detection means such as the position on the vehicle of the camera C1, C2, C3, C4 or of the radar RD that detected the obstacle (see step E3).

Next, the phases of polling LOC and identification ID are carried out with the transceivers the transmission parameters of which have thus been modified (step E5).

In one particular embodiment of the method according to the invention, the method deactivates the transceiver TR1, TR2, TR3, TR4 oriented toward the obstacle or the transmission area of which covers the obstacle. The polling and identification phases are then carried out with all the other transceivers remaining active.

Thus, by reducing the transmission range of the transceiver or its polling frequency or by deactivating it, the power consumption of said transceiver is greatly reduced. The polling and identification phases are then carried out only by means of the transceivers that are still activated.

In a second embodiment of the invention, the method makes provision for the transceivers TRi−1, TRi+1 located adjacent to the transceiver the transmission parameters of which have been modified, to have their transmission power P(TRi+1), P(TRi−1) increased (step E4b), then the phases of polling LOC and identification ID are carried out not only with the transmitter the transmission parameters of which have been modified but also with these adjacent transmitters the power of which has been increased.

This is illustrated in FIGS. 2A, 2B, 2C and 2D.

Figure 2A:
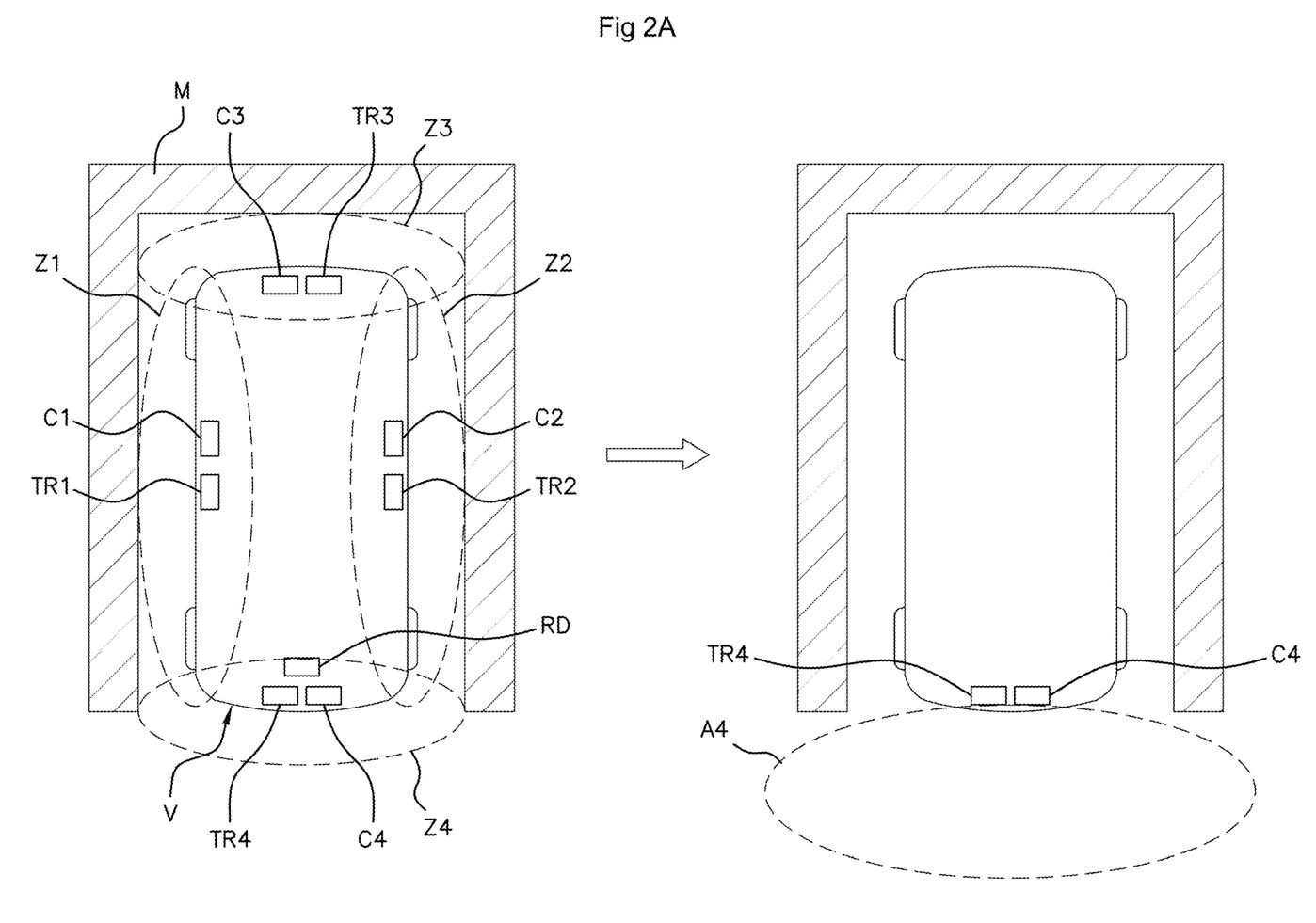

In FIG. 2A, the vehicle V is parked and surrounded by a wall M on three of its four sides. On the left of FIG. 2A, the driver assistance system ADS, by virtue of the side cameras C1, C2, C3, has been able to view, in the areas Z1, Z2, Z3, and Z4, the presence of a stationary obstacle, and may even have identified it as a wall. It follows, according to the activation method according to an aspect of the invention, that only the transceiver TR4 located at the rear of the vehicle V and not located facing a wall is then activated for the polling and identification phase and generates a transmission area A4 in order to detect the portable access equipment SD in this area belonging to the predetermined area ZD. The other transceivers TR1, TR2, TR3 facing a wall M are then deactivated during these two phases in order to reduce discharge of the battery of the vehicle V.

Figure 2B:
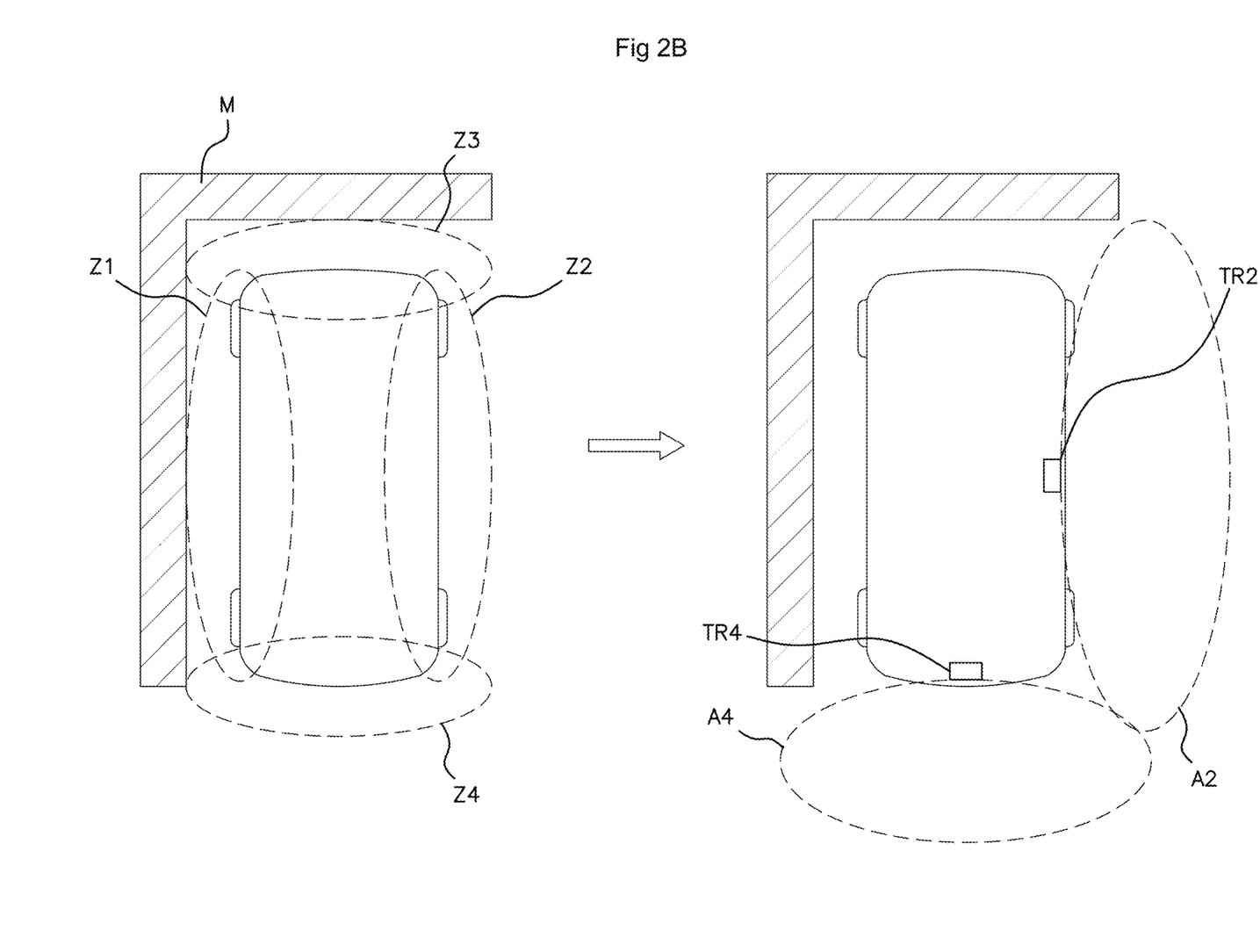

In FIG. 2B, this time the vehicle is parked and surrounded by a wall M on two of its four sides. Similarly, only the two transceivers TR2 and TR4 are activated in the polling and identification phases and generate two transmission areas A2 and A4. The other two transceivers TR1 and TR3 are deactivated or have their transmission power or polling frequency reduced. In this embodiment, the two transceivers TR2, TR4 adjacent to those which have been deactivated have their range increased. Thus, the predetermined area ZD for polling and identification created by the two active transceivers TR2, TR4 is larger than in the prior art.

Figure 2C:
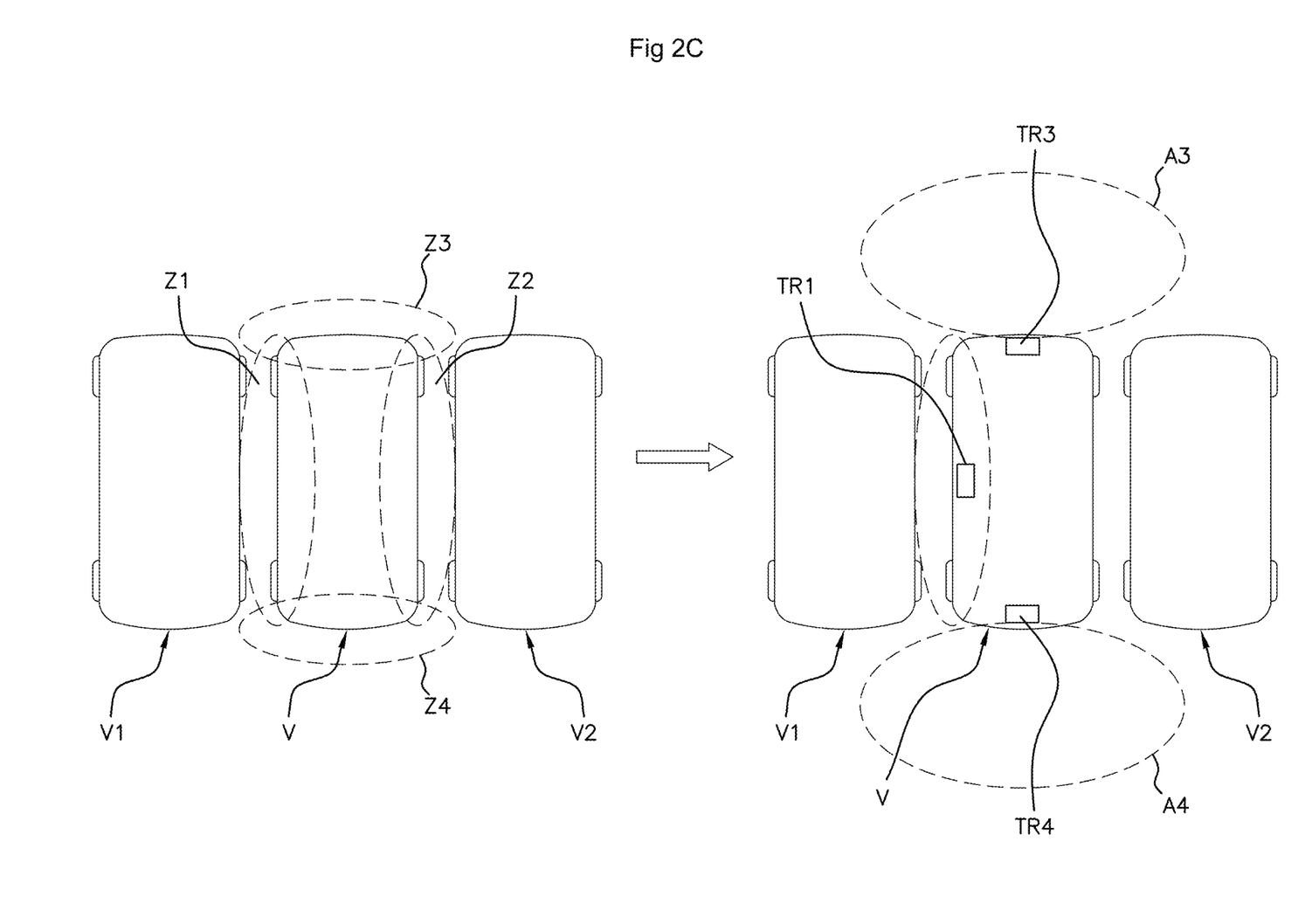

In FIG. 2C, the vehicle is parked between two other vehicles V1 and V2. The driver assistance system ADS detects the presence of these two vehicles on both sides of the vehicle V, in the areas Z1 and Z2. In this case, only the two receivers TR3 and TR4 located at the front and rear of the vehicle are activated during both polling and identification phases, and the transceiver TR1 on the driver's side has its transmission range reduced. This makes it possible to continue to detect the driver should they for example reach the driver's door via a blind spot that cannot be detected only by the transceiver TR3 located at the front of the vehicle V.

Figure 2D:
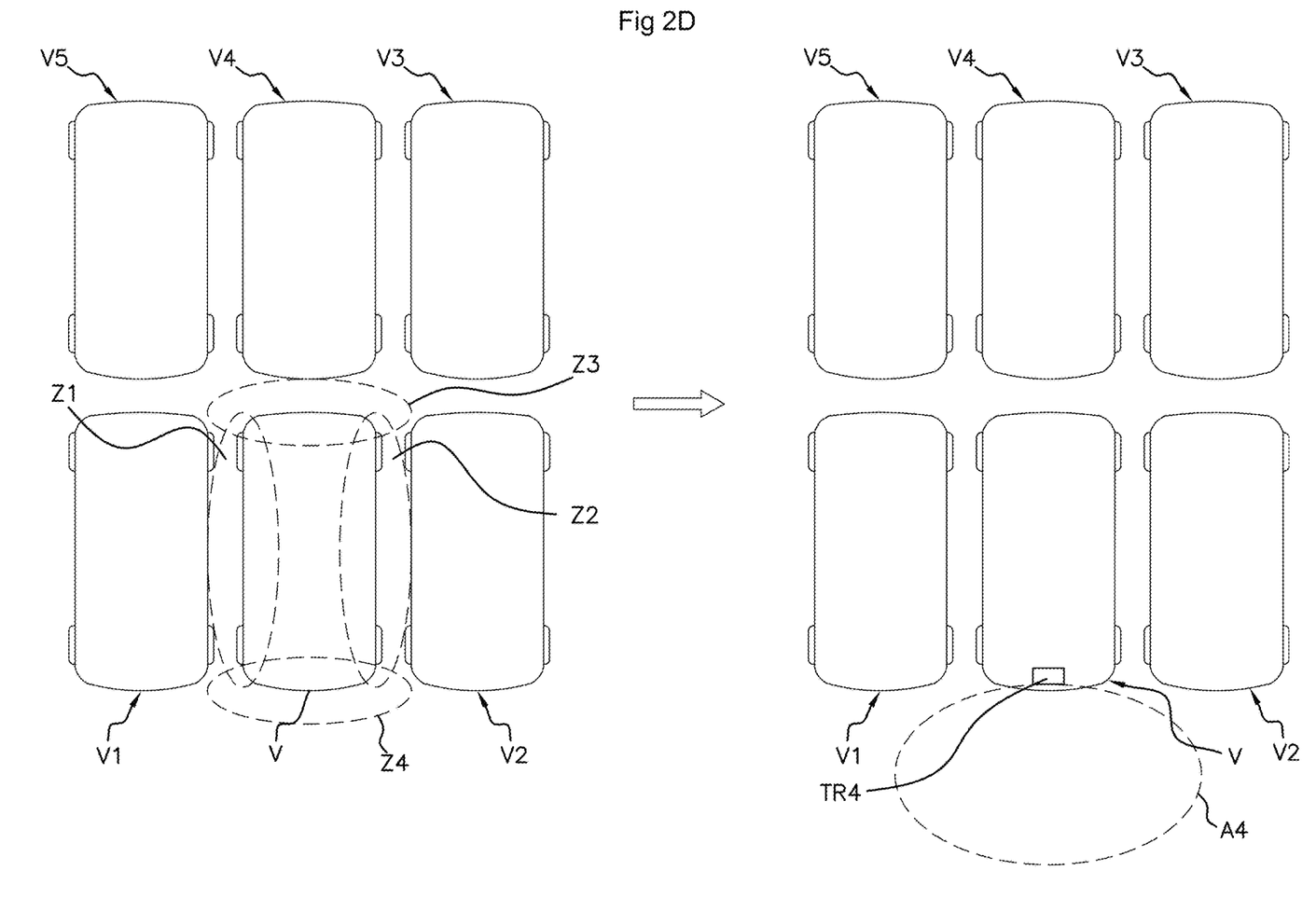

In FIG. 2D, the vehicle V is parked between two vehicles V1, V2 and in front of a row of three other vehicles V3, V4, V5. The driver assistance system ADS views the five vehicles and identifies them as stationary objects, or even categorizes them as vehicles. In this case, only the transceiver TR4 located at the rear of the vehicle is active during the polling and identification phases, the other three transceivers TR1, TR2, TR3 being deactivated. For example, the range of the transceiver TR4 may be increased in order to improve the reliability with which the user's approach is detected. This may be particularly useful in the case where the vehicle V is parked in an underground parking lot where many reflections will degrade detection reliability.

The invention therefore allows, in an ingenious way, by making the device for activating a vehicle function interact with the driver assistance system, energy to be saved during the phases of polling and identification of portable access equipment by activating only the "useful" transceivers, i.e. transceivers not in front of a stationary obstacle. The invention also makes it possible to avoid generation of multiple reflections of waves from said obstacles, which reflections, in the prior art, interfered with the waves received during detection of the portable equipment and impacted the reliability of said detection.

The invention claimed is:

1. A method for activating a function of a motor vehicle by an activation device comprising:
   a plurality of transceivers capable of transmitting to the world outside the vehicle,
   activation of the function of the motor vehicle from portable access equipment carried by a user, the activation being triggered by detection of the presence of the user in a predetermined area around the vehicle during a polling phase, and
   depending on a result of authentication of the portable access device by the vehicle during an identification phase, the vehicle further being equipped with a driver assistance system comprising means for detecting and identifying obstacles in an environment nearby the vehicle, the method comprising:
   a) detection by the driver assistance system of at least one stationary obstacle in the predetermined area, and identification of said obstacle, and
   b) a polling and identification phase, in which a modification of, for those transceivers transmitting in the direction of the obstacle thus detected and identified, i) a power level of the transceivers, and/or ii) a periodicity at which the transceivers are activated.

2. The activation method as claimed in claim 1, wherein the modification of the transmission parameters comprises deactivation of the respective transceivers and wherein the polling and identification phases are carried out using the transceivers that are not deactivated.

3. The activation method as claimed in claim 1, wherein the modification of the transceivers comprises a reduction in transmission range.

4. The activation method as claimed in claim 1, wherein the modification of the transceivers comprises a reduction in range and a reduction in polling periodicity.

5. The activation method as claimed in claim 1, further comprising increasing the range of the transceivers adjacent to the transceivers for which the transmission parameters have been modified.

6. The activation method as claimed in claim 1, further comprising a preliminary phase of determining the transceivers transmitting in the direction of the obstacle and the transmission parameters of which are to be modified depending on a position of the obstacle and/or depending on a position of an obstacle detection and identification means.

7. The activation method as claimed in claim 1, wherein the detection and identification are carried out when the vehicle is at rest with an engine/motor of said vehicle turned on.

8. The activation method as claimed in claim 1, wherein the detection and identification are carried out at a predetermined periodicity when the vehicle is at rest, with the engine/motor turned off.

9. The activation method as claimed in claim 1, wherein the obstacle determination and identification phase and the polling phase are synchronized.

10. The activation method as claimed in claim 1, wherein the parameter modification means consist of transceiver deactivation means.

11. A non-transitory computer program product comprising program code instructions for executing the method as claimed in claim 1 when said program is executed on a computer.

12. The activation method as claimed in claim 1, wherein with the engine/motor turned off the driver assistance system periodically switches between a deactivated mode and an activated mode and visa-versa.

13. The activation method as claimed in claim 12, wherein when the driver assistance system enters the activated mode after the deactivated mode the driver assistance system is synchronized with the polling phase.

14. The activation method as claimed in claim 1, wherein the activated function of the vehicle is selected from the group consisting of:
   locking of an opening element of the vehicle,
   unlocking of the opening element of the vehicle,
   activation of headlights of the vehicle,
   activation of a seat heater of the vehicle, and
   application of driver specific presets.

15. A motor vehicle comprising:
   a device for activating a vehicle function comprising a plurality of transceivers capable of transmitting to the world outside the vehicle, activation of the function being triggered by detection of a presence of a user in a predetermined area around the vehicle during a polling phase, and depending on a result of an authentication of a portable access device carried by the user by the vehicle during an identification phase,
   a driver assistance system comprising means for detecting and identifying obstacles in an environment nearby the vehicle, wherein:
   a) the driver assistance system is capable of:
      i) detecting stationary obstacles in the predetermined area,
      ii) identifying said obstacles,
   b) and the vehicle further comprises:
      means for modifying transmission parameters, during the polling and identification phases, of the transceivers transmitting in a direction of the obstacle depending on the detection and identification of said obstacle by the driver assistance system, the modified transmission parameters comprising i) a power level of the transceivers, and/or ii) a periodicity at which the transceivers are activated.

16. The motor vehicle as claimed in claim 15, wherein the parameter modification means comprises range reduction means.

17. The motor vehicle as claimed in claim 15, wherein the parameter modification means comprises polling periodicity reduction means.

18. The motor vehicle as claimed in claim 15, wherein the parameter modification means comprises range reduction means and polling-periodicity reduction means.

19. The motor vehicle as claimed in claim 15 further comprising means for increasing the range of the transceivers adjacent to the transceivers having modified transmission parameters.

20. The motor vehicle as claimed in claim 15, wherein the driver assistance system comprises at least one camera, and/or at least one radar, and/or at least one lidar.

21. The motor vehicle as claimed in claim 15, further comprising means for determining the transceivers the transmission parameters of which are to be modified depending on a position of the obstacle, and/or depending on a position of the obstacle detection and identification means.

22. The motor vehicle as claimed in claim 15, wherein the modification of the transmission parameters comprises reducing or enlarging the transmission area of the transceiver.

* * * * *